United States Patent Office 3,231,364
Patented Jan. 25, 1966

3,231,364
FERTILIZER MANUFACTURE WITH
REDUCED WATER CONTENT
Donald Harold Booth, Carleton, near Pontefract, and Geoffrey Naylor Quinton, Kirton, near Ipswich, England, assignors to Fisons Fertilizers Limited, Felixstowe, Suffolk, England
No Drawing. Filed Jan. 30, 1963, Ser. No. 255,078
Claims priority, application Great Britain, Feb. 8, 1962, 4,835/62
8 Claims. (Cl. 71—39)

The present invention relates to the preparation of fertilizers based on ammonium nitrate and monoammonium phosphate.

It is known that mixtures of ammonium nitrate and monoammonium phosphate may be made by ammoniation of nitric acid and phosphoric acid and that the product may be mixed with other materials. However in order to avoid the formation of thick and viscous slurries which are impossible to handle and process it has been considered necessary to effect the ammoniation in the presence of fairly large quantities of water. The precise amount of water varied with the relative proportions of ammonium nitrate to monoammonium phosphate but was never less than 11% by weight of water and might have been as much as 25% by weight as the proportion of phosphate increased, the percentage being based on the weight of the product comprising ammonium nitrate and monoammonium phosphate and water. Obviously such large quantities of water are undesirable requiring as they do expensive granulation and drying stages. The necessity of using these large amounts of water also prevents full utilisation of the heat of reaction of ammoniation.

It is also known that melts can be obtained by fusing mixtures of ammonium nitrate and monoammonium phosphate, these melts being anhydrous or containing only small amounts of water. Melts of this nature which are anhydrous or contain only small amounts of water cannot however be formed by straightforward ammoniation of a mixture of phosphoric and nitric acids as has been suggested. In fact if it is attempted to make a substantially anhydrous melt comprising ammonium and monoammonium phosphate by simply reacting anhydrous ammonia with a mixture of phosphoric and nitric acids the mixture becomes so hot that the ammonia is not absorbed.

Mixtures of ammonium nitrate and monoammonium phosphate are said to fuse at temperatures above 165° C. and not to possess sufficient fluidity to be processed at temperatures below 170° C.

Most surprisingly it has now been found that melts sufficiently fluid to be processed at temperatures less than 170° C. and comprising ammonium nitrate and monoammonium phosphate can be formed by ammoniation of an acid mixture comprising at least phosphate and nitrate anions, hydrogen cations and water providing the melt formed contains less than 2% by weight of water, the water being reduced to this level by passing an inert gas through at least part of the ammoniated or partly ammoniated acid mixture.

Accordingly the present invention is for a process for the production of compound fertilizers which comprises ammoniating an acid mixture containing at least phosphate and nitrate anions, hydrogen cations and water and reducing the water content of the ammoniated mixture or partly ammoniated acid mixture by passing an inert gas through at least part of the mixture to form a substantially homogeneous liquid melt comprising ammonium nitrate, monoammonium phosphate and condensed phosphates, and up to 2%, preferably up to 1% by weight of water based on the weight of the melt, the melt being at a temperature less than 170° C. and removing the homogeneous liquid melt from the reaction and processing it to obtain a fertilizer product, preferably a granular fertilizer product.

The term monoammonium phosphate as used in this specification covers compounds in which the $NH_3:H_3PO_4$ ratio is in the range 0.9:1 to 1.1:1.

In one embodiment of the present invention the acid mixture is ammoniated in the presence of a body of the substantially homogeneous liquid melt comprising ammonium nitrate and monoammonium phosphate, said melt containing less than 2% by weight of water based on the weight of the melt and having a temperature less than 170° C. In this embodiment of the invention the process is carried out as a continuous process in a reactor provided with means to maintain a volume of reaction fluid. Thus for example the process is suitably carried out in a reactor provided with overflow means for the removal of the product. Also in this embodiment the water content is reduced by a process which comprises removing part of the homogeneous liquid melt, cooling and reducing the water content of the said part by passing a gas through it and then returning said part to the homogeneous liquid melt, so maintaining the melt at the same temperature and water content. The process of this embodiment of the invention may be carried out in one or more stirred tank reactors in series or in parallel.

In the processes in which the homogeneous liquid melt is used as a medium in which to carry out the ammoniation of the acid mixture the melt may be formed in the first place by adding monoammonium phosphate or phosphoric acid and ammonia to molten ammonium nitrate and adjusting the temperature to below 170° C. and adjusting the water content to below 2% by weight based on the weight of the mixture.

In another embodiment of the process of the present invention the acid mixture may be ammoniated by a process which comprises reducing the water content of the mixture to a value in the range 0 to 2% by weight based on the weight of the mixture as the pH of the mixture during ammoniation approaches a value 4. This process is preferably carried out in one or more tubular reactors.

A further embodiment of the present invention is a process wherein the acid mixture is ammoniated by a process which comprises ammoniating an acid mixture containing at least phosphate and nitrate anions, hydrogen cations and water to give a substantially homogeneous liquid mixture comprising ammonium nitrate, monoammonium phosphate and water maintained at or near its boiling point, the homogeneous liquid mixture having (1) a weight ratio $N:P_2O_5$, as calculated from the N content of the ammonium nitrate and the monoammonium phosphate and the $P_2O_5$ content of the monoammonium phosphate, in the range 0.64 to 2.1, (2) a temperature greater than T° C., T being equal to $158(N:P_2O_5)^{-0.11}$, preferably being equal to $164(N:P_2O_5)^{-0.11}$ and (3) a water content which is at a level between a minimum value of 2% by weight, preferably a minimum value of 3% by weight, and a maximum value of W% by weight, the percentage by weight being based on the weight of the homogeneous liquid mixture and W being equal to $$(2+4N:P_2O_5)$$

and wherein the water content is reduced by a process which comprises taking the homogeneous liquid mixture and passing a gas through it to form a substantially homogeneous liquid melt comprising ammonium nitrate, monoammonium phosphate, condensed phosphates and up to 2% by weight of water, preferably up to 1% by weight of water based on the weight of the melt, the melt being at a temperature less than 170° C.

In the process of the present invention the gas is preferably passed through the ammoniated or partly ammoniated or partly ammoniated acid mixture when the pH of the mixture is greater than 1.5, the pH being that of a saturated solution at 20° C.

The inert gas is preferably air and is used at a temperature high enough not to cool the melt to a temperature at which it is not fluid, for example, at least 150° C. The amount of air may be in the range 5 to 20% by weight of the melt.

An important feature of the present invention is that, at moisture contents less than 2% by weight based on the weight of the homogeneous liquid mixture, the crystallisation temperature of the mixture is substantially lower than that of a melt containing 2 to 4% by weight of moisture. This lowering of the melting point cannot be fully explained but may be due at least in part to the formation of condensed phosphates such as orthophosphates and pyrophosphates. In general the smaller the quantity of water the lower is the temperature at which the homogeneous liquid melt can exist. For instance homogeneous liquid melts which contain less than 1% by weight of water have a substantially lower crystallisation temperature than those mixtures containing 2% water.

The range of temperatures at which melts comprising ammonium nitrate, monoammonium phosphate and, optionally, a small amount of water, are stable as homogeneous liquids depends on the ratio $N:P_2O_5$. It has been found that the greater the ratio $N:P_2O_5$ up to a maximum of 2:1 the greater is the temperature range in which the ammonium nitrate/monoammonium phosphate mixture is liquid. Depending on the $N:P_2O_5$ ratio the temperature at which mixtures comprising ammonium nitrate, monoammonium phosphate and, optionally, a small amount of water are stable as homogeneous liquids is in the range 130° C. upwards. Suitably the process of the present invention is operated at temperatures below 165° C., preferably at a temperature less than 160° C.

The $N:P_2O_5$ ratio as calculated from the nitrogen content of the ammonium nitrate and the monoammonium phosphate and the $P_2O_5$ content of the monoammonium phosphate may vary from 1:2 to 2:1 but preferably varies from 1:2 to 1.75:1. The homogeneous liquid melt preferably contains at least 10% by weight of monoammonium phosphate.

The acid mixture to be ammoniated preferably contains phosphate anions as phosphoric acid and nitrate anions as nitric acid or ammonium nitrate. The acid mixture may also contain ammonium cations, for example in the form of ammonium nitrate or ammonium sulphate. Moreover the acid mixture may contain sulphuric acid. If sulphuric acid is present during the ammoniation the heat of reaction in producing ammonium sulphate can be used to reach and maintain the elevated temperatures required. The amount of ammonium sulphate formed during this reaction should not however exceed 20% by weight based on the weight of the mixture. Wet-process phosphoric acid contains some sulphuric acid. The phosphoric and nitric acids are preferably concentrated and the phosphate ions may be added as superphosphoric acid.

The homogeneous liquid melt may be processed to obtain a fertilizer material in a number of ways. For example the melt may be prilled by spraying it into a gaseous cooling medium whereupon it forms granules. Alternatively the liquid mixture may be discharged for example onto a drum or belt cooler whereupon it solidifies and is removed as a hard flake. The flake is broken up in a disintegrator to give a granular product of the desired size range. The fines materials from the disintegration, normally between the limits of 5–30% of the product material, may be returned to the head of the system and incorporated in the melt or slurry. These may be introduced with other components, such as potassium salts, where these are included. The storage properties of these materials is excellent and cake less than materials of the same overall composition made by agglomerative granulation processes.

The melt may also be processed to obtain a granular fertilizer material by a process which comprises mixing the melt with other fertilizer materials and granulating the product. The other fertilizer materials may be selected from the group comprising potassium salts, ammonium sulphate, urea, superphosphates and trace elements. Preferably the other fertilizer materials are potassium chloride or potassium sulphate and/or ammonium sulphate.

Any number of fertilizer compositions can be realised using the methods of the present invention and nutrient ratios such as the following are possible 1:2:1, 1:2:2, 1:1:1, 2:1:1, 2:2:1, 2:1:2, etc.

The following experiment illustrates the impracticability of making anhydrous ammonium nitrate, monoammonium phosphate mixtures by merely ammoniating acids.

EXPERIMENT

A mixture of 144 parts per hour of phosphoric acid (50% $P_2O_5$) and 440 parts per hour of 65% nitric acid were ammoniated in two stirred vessels connected so that the contents of the first vessel overflowed into the second vessel. The proportion of ammonia fed to the first vessel to that fed to the second vessel was 7:1.

The temperature of the reaction mixture rose steadily and the water content was reduced by boiling until at 1.5% water the temperature was 200° C. At 1% water the temperature was 215° C. and ammoniation ceased even on feeding a large excess of ammonia.

The following examples illustrate the present invention.

*Example 1*

242 parts per hour of 95% ammonium nitrate and 72 parts per hour of wet-process phosphoric acid (50% $P_2O_5$) were fed into a half-inch diameter stainless steel tube into which was injected ammonia. The product leaving the tube had a water content of 5–6% and a pH of 2.5 at 155° C.

Further ammoniation was carried out countercurrently in a heated packed tower. Hot air at 180° C. passed countercurrently with the ammonia was used to assist in reducing the moisture content. The product leaving the reactor was a homogeneous liquid having a temperature of 160° C. and pH of 4.0 and the following analysis: 27% N, 16% $P_2O_5$, 0.3% $H_2O$.

*Example 2*

300 parts per hour of wet-process phosphoric acid (50% $P_2O_5$), 246 parts per hour of 57% nitric acid and 556 parts per hour of ammonium nitrate were fed continuously into a stirred tank provided with an overflow and ammoniated to pH 4 at 160–165° C. The water content of the mixture was 5–6%. This material was fed into a tower through which air at 180° C. was passed countercurrently to give a homogeneous liquid product containing 0.6% $H_2O$ at 150° C. to 160° C. The product had an $N:P_2O_5$ weight ratio of 2:1.

*Example 3*

500 parts of a molten mixture of ammonium nitrate and monoammonium phosphate containing 0.5% by weight of water at a temperature of 165° C. was agitated in a vessel while adding thereto 47.7 parts of 50% $P_2O_5$ wet-process phosphoric acid per hour, 52.3 parts of ammonium nitrate per hour and 6.2 parts of ammonia. At the same time 150 parts per hour of the molten mixture was circulated through a drying tower and there contacted with air at 150° C. thereby reducing the water content before returning the mixture to the vessel. 100 parts per hour of product were obtained having a water content 0.5% by weight and a weight ratio $N:P_2O_5$ of 1:1.

*Example 4*

A melt prepared as in Example 2 was sprayed at a rate of 40 parts per hour on to 9.7 parts per hour of muriate of potash and 24.9 parts per hour of recycled fines contained in a rotating drum and maintained at 119° C. A granular product having an $N:P_2O_5:K_2O$ weight ratio of 2:1:1 and $H_2O$ content of 0.2% was obtained. 69% of the granular product was within the desirable size range of one-sixteenth inch to three-sixteenths inch. The product was shown to have excellent storage properties.

We claim:
1. A process for the production of compound fertilizers which comprises ammoniating an acid mixture consisting of a mixture of compounds selected from the group consisting of ammonium nitrate, monoammonium phosphate, nitric acid and phosphoric acid, and containing phosphate and nitrate anions, hydrogen cations, ammonium cations and water and reducing the water content of the mixture by passing an inert gas through the mixture when, as a saturated solution at 20° C., it has a pH of at least 1.5, to form a substantially homogeneous liquid melt comprising ammonium nitrate, monoammonium phosphate, condensed phosphates and up to 2% by weight of water based on the weight of the melt and the temperature of the melt being less than 170° C., and converting said melt to a granular fertilizer product.

2. In a process for the production of compound fertilizers which comprises ammoniating an acid mixture consisting of a mixture of compounds selected from the group consisting of ammonium nitrate, monoammonium phosphate, nitric acid and phosphoric acid, and containing phosphate and nitrate anions, hydrogen cations, ammonium cations and water and reducing the water content of the mixture by passing an inert gas through it to form a substantially homogeneous liquid melt comprising ammonium nitrate, monoammonium phosphate, condensed phosphates and up to 2% by weight of water based on the weight of the melt and the temperature of the melt being less than 170° C., and converting the said melt to a granular fertilizer product, the improvement wherein the acid mixture is ammoniated by a process which comprises adding the components of the acid mixture and ammonia to a pool of said homogeneous liquid melt in such proportions as to maintain the melt at substantially the same $N:P_2O_5$ ratio, and wherein the water content is reduced by a process which comprises removing part of the pool of melt, cooling and reducing the water content of the said part by passing a gas through it and then returning said part to the homogeneous liquid melt, so maintaining the melt at the same temperature and water content.

3. A process as claimed in claim 2 wherein the acid mixture containing phosphate and nitrate anions, hydrogen cations and water comprises phosphoric acid and a nitrate selected from the group consisting of ammonium nitrate and nitric acid.

4. A process as claimed in claim 2 wherein the acid mixture containing phosphate and nitrate anions, hydrogen cations and water comprises phosphoric acid, sulphuric acid and a nitrate selected from the group consisting of ammonium nitrate and nitric acid.

5. A process for the production of compound fertilizers which comprises ammoniating an acid mixture consisting of a mixture of compounds selected from the group consisting of ammonium nitrate, ammonium phosphate, nitric acid, and phosphoric acid and containing phosphate and nitrate anions, hydrogen cations, ammonium cations and water to give in the first place a substantially homogeneous liquid mixture comprising ammonium nitrate, monoammonium phosphate and water maintained at approximately its boiling point, the homogeneous liquid mixture having (1) a weight ratio $N:P_2O_5$ as calculated from the N content of the ammonium nitrate and the monoammonium phosphate and the $P_2O_5$ content of the monoammonium phosphate in the range 0.64 to 2.1, (2) a temperature greater than T° C., T being equal to from $158(N:P_2O_5)^{-0.11}$ to $164(N:P_2O_5)^{-0.11}$ and (3) a water content which is at a level between a minimum value of 2% by weight and a maximum value of W% by weight, the percentage by weight being based on the weight of the homogeneous liquid mixture and W being equal to $(2+4N:P_2O_5)$ and passing an inert gas through the substantially homogeneous liquid mixture to reduce the moisture content and to form the substantially homogeneous liquid melt comprising ammonium nitrate, monoammonium phosphate, condensed phosphates and up to 2% by weight of water based on the weight of the melt, the temperature of the melt being less than 170° C.

6. A process as claimed in claim 5 wherein the acid mixture comprises phosphoric acid and a nitrate selected from the group consisting of ammonium nitrate and nitric acid.

7. A process as claimed in claim 5 wherein the acid mixture comprises phosphoric acid, sulphuric acid and a nitrate selected from the group consisting of ammonium nitrate and nitric acid.

8. A continuous process for the production of compound fertilizers which comprises:
 (a) feeding 47.7 parts per hour of 50% phosphoric acid, 52.3 parts per hour of ammonium nitrate and 6.2 parts per hour of ammonia into a reaction vessel provided with overflow means and stirring means and containing 500 parts of a melt of ammonium nitrate and ammonium phosphate and said melt having a temperature below 170° C. and containing less than 2% water;
 (b) removing 150 parts per hour of the melt from said reaction vessel and passing said parts countercurrently to a stream of air at a temperature of about 150° C. to reduce the water content thereof;
 (c) returning the said removed part, the water content of which has been reduced, to the said reaction vessel; and
 (d) continuously removing through said overflow means an amount of product equal to the amount of feed introduced into the system.

References Cited by the Examiner
UNITED STATES PATENTS

| | | | |
|---|---|---|---|
| 2,657,977 | 11/1953 | Stengel et al. | 71—64 |
| 2,798,801 | 7/1957 | Kieffer et al. | 71—64 |
| 2,857,262 | 10/1958 | Graham | 71—64 |
| 2,893,858 | 7/1959 | MacDonald et al. | 71—64 |
| 2,912,318 | 11/1959 | Kieweg | 71—64 |
| 2,957,763 | 10/1960 | Barnes et al. | 71—64 |
| 3,037,855 | 6/1962 | Smith | 71—64 |
| 3,050,385 | 8/1962 | Parker | 71—64 |

DONALL H. SYLVESTER, *Primary Examiner.*

ANTHONY SCIAMANNA, *Examiner.*